United States Patent Office 2,781,245
Patented Feb. 12, 1957

2,781,245

PROCESS OF RECOVERING AMMONIA FROM AMMONIACAL LIQUORS

Harold E. Robertson and Barney O. Strom, Syracuse, N. Y., assignors to Allied Chemical & Dye Corporation, New York, N. Y., a corporation of New York No Drawing. Application September 18, 1952, Serial No. 310,366

11 Claims. (Cl. 23—193)

This invention relates to a process of recovering ammonia from liquors containing ammonium compounds. It relates more particularly to improvements in the recovery of ammonia from aqueous ammoniacal brines wherein the brine is treated with lime for the purpose of decomposing ammonium compounds in the brine and liberating ammonia, for example, in the distillation of ammonia as a part of the ammonia-soda process of making sodium carbonate, or in the working up of ammoniacal solutions formed as a by-product in the destructive distillation of coal.

A primary object of the present invention is to provide improvements in the process of recovering ammonia from ammoniacal brines with the aid of lime, whereby economies can be effected in the use of lime. A further object of the invention is to provide improvements in the process of recovering ammonia from ammoniacal brines formed in the ammonia-soda process of making sodium carbonate whereby more efficient utilization of the lime, and especially milk of lime, can be obtained and other economies effected in the process.

Other objects of the invention in part will be obvious and in part will appear hereinafter.

In the manufacture of sodium carbonate by the ammonia-soda process, ammonia and carbon dioxide are absorbed in a sodium chloride brine; sodium bicarbonate is precipitated and removed by filtration; and the filtrate, which constitutes an ammoniacal brine and which contains ammonium carbonate, ammonium chloride, unconverted sodium chloride and other salt impurities, is subjected to an ammonia recovery treatment. This usually involves a three-stage treatment.

In the first stage, the brine is subjected to a distillation treatment, usually carried out in the upper portion (the so-called "RH section") of a distillation column, which effects thermal decomposition of ammonium carbonate present in the brine and removes a portion of the ammonia held in the brine, as well as a portion of the ammonia and carbon dioxide liberated by the thermal decomposition.

In the second stage, the remaining brine, containing ammonium chloride and other fixed ammonium compounds, is subjected to the decomposing action of lime, in the form of milk of lime or in the form of quick lime (dry calcium oxide), usually carried out in a separate agitated tank or other apparatus called a "prelimer." The brine remaining from the first distillation is withdrawn from the upper portion of the distillation column and treated in the prelimer with lime (milk of lime or quick lime) in an amount somewhat in excess of that theoretically required to decompose all of the fixed ammonium compounds present in the brine. Thus, a conventional method of carrying out the liming treatment involves mixing 1 part of milk of lime (obtained, for example, by mixing quick lime with 3 times its weight of water) with about 3 parts by weight of an ammoniacal brine from which volatile ammonia has been partially removed by distillation (and containing, for example, 14% by weight of ammonium chloride, 5.5% by weight of sodium chloride, 1.5% by weight of free ammonia and 79% by weight of water) and agitating the mixture at a temperature of 80° C. to 100° C.

The third stage involves distillation of the lime-treated brine to remove ammonia liberated by the liming treatment. This is usually carried out (1) by returning the lime-treated brine from the prelimer to the lower portion (the so-called "DS section") of the distillation column, wherein it is passed countercurrent to live steam, or (2) by treating with steam in a separate still.

Milk of lime comprises a suspension of particles of lime (calcium hydroxide or oxide) in an aqueous solution of calcium hydroxide. For use in this process, it is usually prepared by calcining limestone, for example, by heating it to 1100° to 1300° C. in kilns and hydrating the resulting quick lime by controlled mixing with water in the proportions of about 3 parts by weight of water per part of the resulting quick lime.

The milk of lime leaving the hydrator contains lumps and coarse particles which are usually removed by rough screening. The milk of lime which passes through the screen generally consists of a suspension of fine particles, less than 200 mesh in size of lime (calcium hydroxide or oxide) in an aqueous solution of calcium hydroxide, together with coarser particles (termed "sand"), 20 mesh to 200 mesh in size and comprising over-burnt lime, silica, alumina and other impurities. The amount of "sand" in the milk of lime may vary from 5% to 10% or more by weight of the milk of lime, depending in part upon the nature and quantity of impurities in the limestone and in part upon the temperature of calcination. The presence of silica and alumina in the limestone and the use of high calcination temperatures tend to increase the amount of "sand" in the milk of lime.

Similarly, in the case of quick lime, the unground, pulverized lime contains substantially the same relative proportion of fine particles of calcium oxide, less than 200 mesh in size, and of "sand," 20 mesh to 200 mesh in size.

The "sand" is relatively unreactive when the "sand"-containing lime is used in the above conventional manner, employing an excess of lime, in the treatment of ammoniacal brines for the liberation of ammonia. It has therefore been the practice heretofore when employing "sand"-containing lime to have a sufficient excess of lime present to compensate for the unreactive "sand" portion thereof. This practice introduces a loss into the process which is of considerable economic importance, since the lime represents one of the main items of expense in the operation of the process.

The present invention is based upon the discovery that the total amount of lime employed for the liming treatment can be decreased and other benefits can be secured by incorporation of certain improvements into the liming treatment.

According to one feature of the present invention, the liming with "sand"-containing lime is carried out in such a manner and under conditions that substantially the total available lime in a "sand"-containing lime (milk of lime or quick lime) is reacted with the ammonium salts in aqueous ammoniacal brines (that is, aqueous solutions of ammonium salts) to liberate ammonia. We have discovered that the "sand" components of limes of the type referred to above will react with ammonium chloride, ammonium sulfate and other ammoniacal salts present in ammoniacal brines if the ammoniacal brine and "sand" are reacted in such proportions that a considerable excess of ammonium salts is present over that required by the equation $$2NH_4A + Ca(OH)_2 \rightarrow 2NH_3 + CaA_2 + 2H_2O$$

(wherein A represents a monovalent anion or equivalent, such as Cl or ½SO₄, etc.) and the concentration of ammonium salts in solution in the brine is at least 5 grams per liter, and preferably at least 40 grams per liter. We have found further that under said conditions the reaction between the "sand" and ammoniacal brine will proceed at a rate sufficiently rapid to permit the process to be carried out continuously.

According to another feature of the present invention, the aqueous ammoniacal brine is subjected to reaction with lime in a plurality of stages, each employing a fraction of the total lime required (an excess of that theoretically required by the above equation). Ordinarily the benefits resulting from plural stage liming are adequately secured by employing two, or at most three, liming stages, at one stage of which a quantity of the brine is reacted with an amount of lime which is less than that theoretically required for complete reaction with the ammonium salts in said quantity of brine and which is limited to leave unreacted in the resulting reacted brine 90% or less by weight of the ammonium salts present in said quantity of brine before reaction, and at another stage of which the reacted brine is further reacted with additional lime in an amount in excess of that required for complete reaction with the remaining ammonium salt in said brine.

We have discovered, when the liming treatment of ammoniacal brines is thus divided into at least two separate treatments, only a small excess of lime over the theoretical (e. g. 2% to 5%) is required, and other advantages and economies in the liming of such ammoniacal brines are secured which more than compensate for the additional cost of the added operations and equipment.

In the practice of the present invention in accordance with one method of procedure a "sand"-containing lime of the type referred to above is separated into a "coarse" or "sand" portion and a "fine" portion, and the "coarse" or "sand" portion is separately reacted with an amount of the ammoniacal brine at least sufficient to provide a considerable excess of ammonium salts over that required for complete reaction with the lime present in the "coarse" or "sand" portion. Thus, in the practice of the present invention in connection with employment of a "sand"-containing milk of lime of the type referred to above, the milk of lime is separated into a "sand" portion and a "milk" portion, and the "sand" portion is separately reacted with an amount of the ammoniacal brine at least sufficient to provide a considerable excess of ammonium salts over that required for complete reaction with the lime present in said "sand" portion.

The resulting brine may then be further treated to liberate ammonia from the remaining unreacted ammonium salts; for example, it may be treated with the "fine" or "milk" portion from which the "coarse" or "sand" portion has been separated, or with milk of lime or other suitable reagent. In the preferred practice of the present invention, the ammoniacal brine resulting from the treatment with the "sand" portion is subjected to further treatment with the "milk" portion which had been separated from the "sand" portion. By so doing, a highly efficient and economical process for the continuous treatment of ammoniacal brines is provided.

In the practice of the present invention in accordance with the preferred method of procedure, employing milk of lime, a "sand"-containing milk of lime in an amount having a total content of lime (calcium hydroxide and calcium oxide) only slightly in excess of that theoretically required for complete reaction with the ammonium salts in the amount of ammoniacal brine undergoing treatment is separated into a "sand" portion and a "milk" portion; the ammoniacal brine is treated first with the "sand" portion under reaction conditions providing substantial utilization of the lime content of the "sand," and then with the "milk" portion under reaction conditions resulting in substantially complete liberation of ammonia from the ammonium salts; and the resulting brine is then subjected to distillation for removal of ammonia in any suitable manner.

For continuous liming of ammoniacal brines, the amount of "sand"-containing lime employed with respect to the amount of ammoniacal brine subjected to the treatment in a given period of time is preferably slightly in excess of that sufficient to result in substantially complete liberation of ammonia from the ammonium salts present in the brine at the end of the treatment period.

The reaction between the brine and "sand" portion is preferably carried out under the reaction conditions and with the proportions of brine and "sand" set out below. The reaction between the resulting "sand"-treated brine and the "milk" portion of a milk of lime may be carried out in any suitable manner; for example, under conditions employed in the usual preliming treatment. Preferably the treatment with each portion is carried out with sufficient agitation to secure intimate contact between the lime and the brine, and for a sufficient period of time to result in substantially complete reaction between the lime and the ammonium salts in the brine.

The process of the present invention has a number of advantages of economic importance. Since it utilizes substantially the total lime content of the "sand"-containing limes, the amount of lime used in the liming operation can be reduced considerably. By separating the "sand" portion from the "milk" portion of milk of lime, and reacting the "sand" portion with the total ammoniacal brine, the excess of ammonium salts with respect to lime in the "sand" portion required for efficient reaction of the "sand" with the ammonium salts in the brine is readily secured. Similarly, when the resulting brine is then treated with the "milk" portion for the completion of the ammonia-liberating reaction, the amount of lime present is in excess of the amount theoretically required. As a consequence, only a small excess of total lime over that theoretically required need be employed.

The process has the further advantage that it can be integrated into existing liming operations merely by the addition of a suitable separator for separating the lime into "coarse" and "fine" portions, and the provision of an additional liming vessel, which may be of the type heretofore employed. Thus, in the recovery of ammonia from ammoniacal brines as a part of the Solvay process for the manufacture of sodium carbonate, employing an ammonia still and prelimer for the liming treatment of ammoniacal brines containing fixed ammonium salts, the process of the present invention can be incorporated into existing operations merely by the addition of a separator for separating the lime into "coarse" or "sand" and "fine" or "milk" portions, and a second prelimer. Similarly, in the recovery of ammonia from ammonia liquor obtained in the destructive distillation of coal, the process of the present invention can be incorporated into the usual ammonia-distillation operation merely by the addition of a separator for the "coarse" or "sand" and "fine" or "milk" portions of the lime, and a second liming leg.

The invention will be illustrated by the following specific examples, in which parts are by weight and temperatures are in degrees centigrade.

*Example 1*

Burnt lime was produced by calcining a limestone having the following composition:

|   | Percent |
|---|---|
| $CaCO_3$ | 86 |
| $MgCO_3$ | 5 |
| $SiO_2$ | 5 |
| Other constituents | 4 | by heating the limestone to a temperature of 1100° C. to 1300° C. in lime kilns. The burnt limestone was converted to milk of lime by mixing 1 part of the resulting burnt limestone with 3 parts of water. The milk of lime thus produced was rough screened to remove particles greater than 20 mesh in size. The resulting milk of lime contained, besides water, the following substances in grams per liter of milk of lime:

250 grams of calcium oxide equivalent;
50 grams of calcium carbonate;
30 grams of other impurities.

As employed herein and in the claims, the term "calcium oxide equivalent" refers to total lime (present as calcium hydroxide with or without calcium oxide) calculated as CaO. When passed through a 200 mesh screen (U. S. Tyler standard), 5 to 10% by weight of the milk of lime was retained on the screen in the form of coarse particles, of which 99% passed through a 20 mesh screen. These coarse particles contained 15% by weight of calcium oxide equivalent and 85% by weight of silica and other impurities.

The milk of lime was separated, in a separator of the type referred to below, into a "sand" portion, which constituted about 25% by weight of the milk of lime and which contained 20% of the total calcium oxide equivalent of the milk of lime and substantially all of the particles larger than 200 mesh, and a "milk" portion containing the remaining lime and substantially no particles larger than 200 mesh.

An ammoniacal brine, obtained as the discharge from the RH section of an ammonia still for the recovery of free ammonia from ammonium bicarbonate mother liquor produced in the Solvay soda process, was subjected to treatment, first with the "sand" portion and then with the "milk" portion, in the manner set out below. The ammoniacal brine contained 150 grams of ammonium chloride, 59 grams of sodium chloride, and 17 grams of free ammonia, per liter of brine.

The ammoniacal brine and the "sand" portion of the milk of lime were introduced into a reaction vessel equipped with an efficient stirrer (a prelimer of the conventional type) in the proportions of 6 parts of the brine to 0.5 part of the "sand." After reaction between the lime in the "sand" portion and the ammonium chloride in the brine had taken place with stirring for about 10 minutes at the usual liming temperature, an amount of the reacted mixture equal to 6.5 parts was withdrawn from the vessel and introduced into a second reactor of similar type, where it was reacted while stirring with an amount of the "milk" portion of the milk of lime equal to 1.5 parts. After about 30 minutes, substantially all of the ammonium salts formerly present in the mixture in the second reactor had been converted to ammonia and calcium salts, and the mixture was withdrawn from the second reactor and delivered to an ammonia still for recovery of the liberated ammonia in the usual manner. Ammonia gas, which volatilized to some extent in the reactors, was recovered by passing it into the still.

Brine to be treated and "sand" were then continuously charged to the first reactor (prelimer) in proportions corresponding with those originally charged to said reactor and at a rate adapted to provide a holding time in said reactor of about 10 minutes, and a corresponding amount of reacted mixture was continuously withdrawn from the first reactor (or prelimer) and introduced into the second reactor (or prelimer). The "milk" portion of the milk of lime also was continuously introduced into the second reactor (prelimer) at a rate which was correlated with the rate at which mixture was withdrawn from the first reactor and introduced into the second reactor; so as substantially to use up the "milk" separated from the "sand," and thereby secure successive reaction of a given quantity of ammoniacal brine with the "sand" and "milk" portions of a given quantity of the milk of lime. As compared with the process of this example, operation by the conventional process would require 2.15 to 2.2 parts of the milk of lime for complete liberation of the fixed ammonia.

*Example 2*

The process of Example 1 was repeated with the following changes. The milk of lime was separated into a "sand" portion which constituted about 65% by weight of the milk of lime and contained 60% of the total calcium oxide equivalent of the milk of lime and substantially all of the particles larger than 200 mesh. The ammoniacal brine and the "sand" portion of the milk of lime were introduced into the first prelimer in the proportions of 6 parts of the brine to 1.3 parts of the "sand" portion of the milk of lime. After reaction, an amount of the reacted mixture equal to 7.3 parts was withdrawn from the first prelimer and introduced into the second prelimer where it was reacted with an amount of the remaining "milk" of the milk of lime equal to 0.7 part.

It will be realized by those skilled in the art that the invention is not limited to the details of the foregoing specific examples and that changes can be made without departing from the scope of the invention.

The separation of the "coarse" or "sand" portion from the lime may be effected in various ways. Depending on the efficiency of the separator and the degree of separation desired, the "coarse" or "sand" portion of the lime produced by the separator ordinarily will contain substantially all of the "coarse" particles or "sand" (e. g. 95% or more of the particles greater than 200 mesh) together with more or less "fine" or "milk" components of the lime subjected to separation. The degree of separation between the particles greater than 200 mesh in size and the finer particles is preferably controlled so as to leave with the "coarse" or "sand" portion a substantial part of the finer particles in addition thereto; so as to provide additional lime in the "coarse" or "sand" portion. For example, the "sand" portion may contain from 10% to 75% of the total lime (calculated as CaO) in the original lime. Thus, by including in the "sand" portion 50% by weight of the total lime in the milk of lime, calculated as calcium oxide, when a substantially stoichiometric amount of milk of lime is used, a 100% excess of ammonium salts will be present in the reaction between the "sand" portion and the ammoniacal brine over that theoretically required to react with the total lime present in the "sand" portion; whereas, by including in the "sand" portion 10% by weight of the total lime in the milk of lime, a 900% excess of ammonium salts will be present in said reaction, thereby leading to more complete utilization of the lime present in the "sand" portion.

The amount of additional lime separated with the "coarse" or "sand" portion is preferably related to the concentration of ammonium chloride in the brine. Thus, the separation is ordinarily controlled so as to have present in the "coarse" or "sand" portion an amount of lime, calculated as CaO, which will leave in the resulting brine, after reaction of the brine with the "coarse" or "sand" portion, a concentration of ammonium chloride of 15 grams per liter to 100 grams per liter, depending on the original concentration of ammonium chloride in the brine. When the original ammonium chloride concentration is greater than 100 grams per liter, the separation is preferably so controlled that the lime concentration in the "coarse" or "sand" portion, calculated as CaO, is such as to leave in the resulting reacted brine a concentration of ammonium chloride of 50 to 75 grams per liter.

For use of the process in the continuous liming of ammoniacal brines, the separation of milk of lime can be carried out with the aid of a solid bowl continuous centrifuge, a liquid cyclone separator, or other suitable means. The invention is not limited to the use of any particular separation apparatus or method of separation, however.

In reacting the "coarse" or "sand" portion with the ammoniacal brine, the relative proportions of brine and "coarse" or "sand" portion employed will depend upon a number of interrelated factors, such as concentration of ammonium salts in the brine, proportion of the total lime in the "coarse" or "sand" portion, time of reaction, degree of agitation, temperature, etc. Further, the completeness of reaction is affected by various factors, such as particle size of the "sand," conditions of calcination of the limestone, and composition of the limestone. Hence, the exact amount of excess ammonium salts required for complete reaction with a particular "sand" portion will vary with individual "sands."

For use of the process in the continuous liming of ammoniacal brines, a period of contact of 5 to 30 minutes between the "coarse" or "sand" portion and the brine, at the usual liming temperatures (e. g. 80° to 100° C.) and under adequate conditions of agitation and mixing to provide intimate contact between the two, is desirable. In order to obtain reaction of most of the lime content of the "coarse" or "sand" portion with the ammonium salts in the brine within such period of time, the ammoniacal brine is preferably employed in proportions relative to the "coarse" or "sand" portions such as to provide the excess of lime referred to above. More complete reaction of the lime content of the "sand" portion is obtained by the use of amounts of brine near the upper limits of the above ranges than near the lower limits of said ranges, other conditions being the same. By predetermining the total amount of lime required for reaction with the total amount of ammonium salts in a given quantity of brine (preferably a slight excess of the amount of lime theoretically required) and by correlating the distribution of total lime between the "coarse" or "sand" portion of the lime, on the one hand, and "fine" or "milk" portion, on the other hand, in relation to the ammonium salt concentration in the brine as set out above, the proportion of brine to be employed relative to the "coarse" or "sand" portion will be automatically determined.

In the practice of the process in connection with a given quantity of brine, by a procedure of the type illustrated in the above specific examples, wherein the total brine is first reacted with the "coarse" or "sand" portion of the lime and then with the remainder of the lime, it is merely necessary to control the proportion of total lime in the "coarse" or "sand" portion, in order to secure proper proportioning of the brine.

The temperature at which the reaction is carried out is not critical. Usually temperatures near those existing in the ammonia still are employed (such as, 80° to 100° C.), since the brine to be limed is at a temperature near that of steam under the pressure conditions existing in the RH section of the ammonia still and the limed brine is ultimately returned to the still for distillation of the ammonia liberated by the liming treatment.

While the above specific examples relate to the use of milk of lime, the invention is not limited thereto, but includes the use of "sand"-containing lime in other forms. Thus, instead of milk of lime, dry lime containing "sand" can be similarly used in the practice of the present invention.

Further, instead of removing the "fine" portion from the "sand" portion before treatment of the ammoniacal brine, the "sand"-containing lime may be employed as liming agent, the unreacted "sand" may then be recovered from the reacted brine, and the "sand," which contains unreacted lime, may be employed in the initial preliming stage.

Since changes may be made in carrying out the process above described without departing from the scope of the invention, all matter contained in the above description is to be interpreted in an illustrative and not in a limiting sense, except as limited by the appended patent claims.

We claim:

1. In the process of recovering ammonia from an aqueous ammoniacal brine wherein the brine is treated with lime to decompose ammonium compounds in the brine, said lime comprising coarser particles comprising lime associated with impurities and finer lime particles and having been obtained from limestone by calcination thereof, the improvement which comprises separating the coarser particles from the remaining lime, reacting the separated coarser particles with an ammoniacal brine containing at least 5 grams of ammonium compounds per liter of brine, the proportion of ammoniacal brine to the coarser particles of lime being at least sufficient to provide a considerable excess of ammonium compounds, and then reacting the resulting brine with the remaining lime.

2. In the process of recovering ammonia from an aqueous ammoniacal brine containing at least 5 grams of ammonium chloride per liter of brine, wherein the brine is treated with milk of lime to decompose ammonium chloride in the brine, said milk of lime having a total content of lime in excess of that theoretically required for complete reaction with the ammonium salts in the brine and including coarse "sand" particles comprising lime associated with impurities and finer particles of lime and having been obtained by hydration of calcined limestone, the improvement which comprises separating the milk of lime into a "sand" portion comprising said "sand" particles and a "milk" portion comprising the finer particles of lime, treating the brine with the amount of the "sand" portion controlled to decompose only a part of the ammonium chloride in the brine, and then treating the resulting brine with the "milk" portion to decompose remaining ammonium chloride in the brine.

3. In the process of recovering ammonia from an aqueous ammoniacal brine containing at least 40 grams of ammonium compounds per liter of brine, wherein the brine is treated with lime to decompose ammonium compounds in the brine and liberate ammonia, said lime having been obtained from limestone by calcination thereof and including a small proportion of lime in the form of coarse particles which are between 20 and 200 mesh in size and comprise lime associated with impurities, the remainder of lime particles being less than 200 mesh in size, the improvement which comprises effecting reaction between the brine and a quantity of said lime which is slightly more than that theoretically required for complete reaction with the ammonium compounds present in said brine, by reacting to substantially complete consumption in said brine an amount of said lime as a first portion containing all of said coarse particles and controlled to leave unreacted a considerable proportion of the ammonium compounds in said brine, and thereafter reacting the remainder of said lime with resulting partially reacted brine.

4. In the process of recovering ammonia from an aqueous ammoniacal brine wherein the brine is treated with milk of lime to decompose ammonium compounds in the brine, said milk of lime having been obtained by hydration of calcined limestone and having a total content of lime in excess of that theoretically required for complete reaction with the ammonium salts in the amount of brine treated with the milk of lime and said milk of lime containing lime particles less than 200 mesh in size and a small proportion of "sand" particles which are greater than 200 mesh in size and comprising lime associated with impurities, the improvement which comprises dividing the milk of lime into (1) a "sand" portion comprising most of the particles greater than 200 mesh in size and containing not more than 75% by weight of the total lime in said milk of lime, calculated as CaO, and (2) a "milk" portion, reacting the "sand" portion with an aqueous ammoniacal brine in which the concentration of ammonium salts is at least 40 grams per liter, whereby a part of the ammonium salts in the brine is decomposed, and treating the resulting brine with the "milk" portion to decompose remaining ammonium salts in the brine.

5. A process of recovering ammonia from an aqueous ammoniacal brine as defined in claim 4, wherein the "sand" portion of the milk of lime contains 10% to 50% by weight of the total lime in said milk of lime, calculated as CaO.

6. In the process of recovering ammonia from an aqueous ammoniacal brine resulting from the ammonia-soda process of making sodium carbonate and containing ammonium chloride in a concentration of at least 40 grams per liter, wherein the brine is treated with milk of lime to decompose ammonium chloride in the brine and liberate ammonia, said milk of lime having been obtained by hydration of calcined limestone and containing "sand" particles which comprise overburnt lime, silica and other impurities and predominantly are 20 to 200 mesh in size and smaller particles of lime, the improvement which comprises dividing said milk of lime into (1) a "sand" portion comprising substantially all of said "sand" particles and containing 10% to 75% by weight of the total lime in said milk of lime, calculated as calcium oxide, and (2) a "milk" portion comprising the remaining lime, reacting the "sand" portion with an amount of the ammoniacal brine 33% to 900% greater than the amount theoretically required to react with the total lime present in said "sand" portion, calculated as calcium oxide, whereby a part of the ammonium chloride in said brine is decomposed, and then reacting the resulting brine with the "milk" portion to decompose remaining ammonium chloride in the brine.

7. A process of recovering ammonia from an aqueous ammoniacal brine resulting from the ammonia-soda process of making sodium carbonate and containing ammonium chloride in a concentration of at least 40 grams per liter as defined in claim 6, wherein the milk of lime is divided into (1) a "sand" portion comprising at least 95% by weight of the "sand" particles and containing 10% to 50% by weight of the total lime in said milk of lime, calculated as calcium oxide, and the "sand" portion is reacted with such an amount of the ammoniacal brine that the ammonium chloride concentration of the resulting reacted brine is 50 to 75 grams per liter.

8. A process of recovering ammonia from an aqueous ammoniacal brine as defined in claim 4, wherein the "sand" portion contains 10% to 50% by weight of the total lime in said milk of lime, calculated as calcium oxide, and the "sand" portion is reacted with an amount of the ammoniacal brine 100% to 900% greater than the amount theoretically required to react with the total lime present in said "sand" portion, calculated as calcium oxide.

9. In the process of recovering ammonia from an aqueous ammoniacal brine, wherein the brine is treated with lime to decompose ammonium compounds in the brine and liberate ammonia, the improvement which comprises mixing a quantity of a brine containing at least 100 grams per liter of ammonium chloride, in one reaction zone, with an amount of lime insufficient for complete reaction with the ammonium salts in said quantity of brine, said amount of lime being such as to leave in the resulting reacted brine 50 to 75 grams per liter of unreacted ammonium chloride, substantially completely reacting said amount of lime with ammonium salts in said brine in said reaction zone, withdrawing reacted brine from said reaction zone, and reacting the resulting brine with additional lime in another reaction zone, the amount of additional lime being slightly in excess of that required for complete reaction with the remaining ammonium salts in said brine.

10. In the process of recovering ammonia from an aqueous ammoniacal brine, wherein the brine is treated with lime to decompose ammonium compounds in the brine and liberate ammonia, the improvement which comprises mixing a quantity of a brine containing at least 40 grams per liter of ammonium chloride, in one reaction zone, with an amount of lime insufficient for complete reaction with the ammonium salts in said quantity of brine, said amount of lime being such as to leave in the resulting reacted brine at least 15 but not more than 100 grams per liter of unreacted ammonium chloride, substantially completely reacting said amount of line with ammonium salts in said brine in said reaction zone, withdrawing reacted brine from said reaction zone, and reacting the resulting brine with additional lime in another reaction zone, the amount of additional lime being slightly in excess of that required for complete reaction with the remaining ammonium salts in said brine.

11. In the process of recovering ammonia from an aqueous ammoniacal brine wherein an ammoniacal brine containing at least 100 grams per liter of ammonium chloride is continuously reacted with lime to decompose ammonium compounds in the brine and liberate ammonia, said lime having been obtained from limestone by calcination thereof and being composed of coarse particles which comprise overburnt lime, silica and other impurities and which predominantly are 20 to 200 mesh in size, and fine particles of lime less than 200 mesh in size, the fine particles constituting at least 90% by weight of the total particles, the improvement which comprises separating from the line a coarse portion comprising most of said coarse particles and containing 10% to 50% of the total lime, calculated as CaO, reacting the brine with an amount of the coarse portion controlled to maintain a concentration of ammonium chloride in the resulting reacted brine of 50 to 75 grams per liter, and then reacting the resulting brine with an amount of the remaining lime at least sufficient to react with substantially all the fixed ammonia in the resulting brine.

References Cited in the file of this patent

UNITED STATES PATENTS

| | | |
|---|---|---|
| 1,845,030 | Means | Feb. 16, 1932 |
| 1,928,510 | Sperr | Sept. 26, 1933 |
| 1,962,150 | Mohler et al. | June 12, 1934 |
| 2,029,467 | Day | Feb. 4, 1936 |
| 2,156,843 | Garrels et al. | May 2, 1939 |